US012588790B2

(12) United States Patent
Basti

(10) Patent No.: US 12,588,790 B2
(45) Date of Patent: Mar. 31, 2026

(54) SYSTEM AND METHOD OF LOOSENING, REMOVING AND COLLECTING DEBRIS FROM NEWLY MACHINED ARTICLES USING COMPRESSED AIR

(71) Applicant: Basti Holding LLC, Plainville, CT (US)

(72) Inventor: Jason Basti, Bantam, CT (US)

(73) Assignee: BASTI HOLDINGS LLC, Plainville, CT (US)

( * ) Notice: Subject to any disclaimer, the term of this patent is extended or adjusted under 35 U.S.C. 154(b) by 328 days.

(21) Appl. No.: 17/874,042

(22) Filed: Jul. 26, 2022

(65) Prior Publication Data

US 2023/0031985 A1 Feb. 2, 2023

Related U.S. Application Data

(60) Provisional application No. 63/226,232, filed on Jul. 28, 2021.

(51) Int. Cl.

| | |
|---|---|
| ***A47L 7/00*** | (2006.01) |
| ***A47L 9/10*** | (2006.01) |
| ***B08B 5/04*** | (2006.01) |
| ***B24C 9/00*** | (2006.01) |

(52) U.S. Cl.
CPC ............... *A47L 7/0019* (2013.01); *A47L 9/10* (2013.01); *B08B 5/04* (2013.01); *B24C 9/00* (2013.01); *B24C 9/006* (2013.01)

(58) Field of Classification Search
CPC .. B08B 15/02; B08B 3/02; B08B 5/02; B08B 15/023; B08B 15/026; A47L 5/14; A47L 5/365; A47L 9/14; B24C 9/00; B24C 9/006; B24C 3/04
USPC ........................................................... 15/345
See application file for complete search history.

(56) References Cited

U.S. PATENT DOCUMENTS

| | | | | |
|---|---|---|---|---|
| 3,222,707 A * | 12/1965 | Allenbaugh | B08B 15/026 | 15/345 |
| 3,425,250 A * | 2/1969 | Farris, Jr. | B24C 9/006 | 29/90.01 |
| 3,452,751 A * | 7/1969 | Austin, Jr. | A61C 17/12 | 15/409 |
| 5,107,632 A * | 4/1992 | Stern | B07B 7/02 | 451/92 |
| 5,556,324 A * | 9/1996 | Shank, Jr. | B24C 9/00 | 451/87 |
| 6,049,941 A * | 4/2000 | Vollenweider, II | B24B 47/14 | 15/327.5 |

* cited by examiner

*Primary Examiner* — Bryan R Muller
(74) *Attorney, Agent, or Firm* — Dilworth & Barrese, LLP

(57) ABSTRACT

A portable debris removal system cleans debris and fluids from newly machined parts generally includes an enclosure assembly where a user cleans a machined part with a compressed air gun. The air within the enclosure assembly is evacuated for decontamination through a series of filters with remaining contaminates collected in a waste vessel. Ambient air and air gun expressed compressed air are drawn into the system via the Venturi effect created by a Venturi vent positioned on the bottom of the enclosure assembly.

7 Claims, 8 Drawing Sheets

SYSTEM AND METHOD OF LOOSENING, REMOVING AND COLLECTING DEBRIS FROM NEWLY MACHINED ARTICLES USING COMPRESSED AIR

CROSS-REFERENCE TO RELATED APPLICATIONS

This application claims the benefit of U.S. Provisional Patent Application No. 63/226,232 entitled SYSTEM AND METHOD OF LOOSENING, REMOVING AND COLLECTING DEBRIS FROM NEWLY MACHINED ARTICLES USING COMPRESSED AIR, which was filed Jul. 28, 2021. This provisional application is incorporated by reference in its entirety.

BACKGROUND OF THE INVENTION

The present invention relates to post-manufacturing systems and methods, and more specifically, to systems and methods of loosening, removing and collecting debris from newly machined articles using compressed air.

Machining is a subtractive manufacturing process through which raw materials are converted into finished products by the controlled removal of unwanted material from a workpiece. The machining process creates large and small particulates, for example fragments of raw materials and disintegrated coating dust, which can settle on the newly machined article. Additionally, newly machined articles are typically oiled as oil and water-based flood coolants are used in the machining center's cutting process, thereby creating a layer of viscous debris on the machined part.

Compressed air is used to remove oil particulates and or fluid coatings from the recently machined part. Due to the high air pressure being sprayed into the part, droplets of oil are aerosolized and are "blown off" into the ambient factory air. These small particulates of oil remain in the air and can be inhaled by the machinist and other factory workers. This cleaning process with compressed air also causes larger sized oil droplets and metal fragments to scatter and collect onto nearby machinery, people and other items, creating a slippery floor for example. An oil film residue with small metal chips remains in the area and is potentially hazardous.

In order to overcome the safety hazards associated with aerosolizing hazardous liquids and dispersing particulates it is possible to use compressed air in a controlled environment, for example by employing an exhaust hood. This accommodation is undesirably cumbersome because either the machined parts must be transported to the hood, or the hood must be located near where the machining takes place, which requires electricity and a lot of space.

As can be seen, there is a need for systems and methods that remove contaminating particulates but that do not blow particulates and/or aerosolized oil or other fluids into the environment. It is desirable that this system is easy to use, portable, and doesn't require a power source such as electricity.

SUMMARY OF THE INVENTION

A portable debris removal system is particularly well suited for cleaning newly machined parts. The system generally includes an enclosure assembly where a user cleans a machined part with a compressed air gun, with air within the enclosure assembly evacuated for decontamination through a series of filters. Ambient air and air gun expressed compressed air are drawn into the system via the Venturi effect created by a Venturi vent positioned on the bottom of the enclosure assembly. Contaminants such as oil, cleaning fluid and particulates are retained in one of the filters or deposited in a waste vessel. The enclosure assembly is at a height that is functional for operators, with the ability to slightly raise or lower based on the operator's height. The system is compact, easy to use, and relies on the Venturi effect and compressed air to circulate air, thereby removing the need for an external power source such as electricity or batteries, except as may be required for compressed air source.

DETAILED DESCRIPTION OF THE INVENTION

Specific structures are numbered throughout the various figures as follows:

10—Debris removal system;
20—Enclosure assembly;
22—Enclosure body;
23—Grate;
24—Funnel;
25—Enclosure filter frame;
26—Enclosure filter;
27—Back wall;
28—Exhaust tube;
29—Enclosure opening;
30—Air system;
31—Air supply;
33—Venturi ball valve;
34—Foot pedal;
35—Foot pedal valve;
36—Foot pedal valve inlet port;
37—Venturi vent air line;
38—Air gun air line;
39—Coil air line;
40—Air gun;
45—Assembly stand;
47—Platform;
50—Filter assembly;
52—Wet sock filter;
54—Inner filter;
55—Outer filter;
57—Air filter lid;
60—Waste vessel;
70—Venturi vent;
72—Gasket;

74—Venturi inlet;
75—Venturi compressed air inlet port;
76—Venturi tube;
77—Top opening;
78—Bottom opening;
80—Compressed air flow;
82—Ambient air flow;
84—Contaminated air; and
85—Decontaminated air.

As used herein, "air" and the like shall generally refer to gaseous matter including ambient air mostly comprising nitrogen and oxygen, plus various sources of compressed gaseous matter including compressed ambient, compressed pure gasses such as oxygen or nitrogen, and compressed mixtures of gas.

Figure 1:
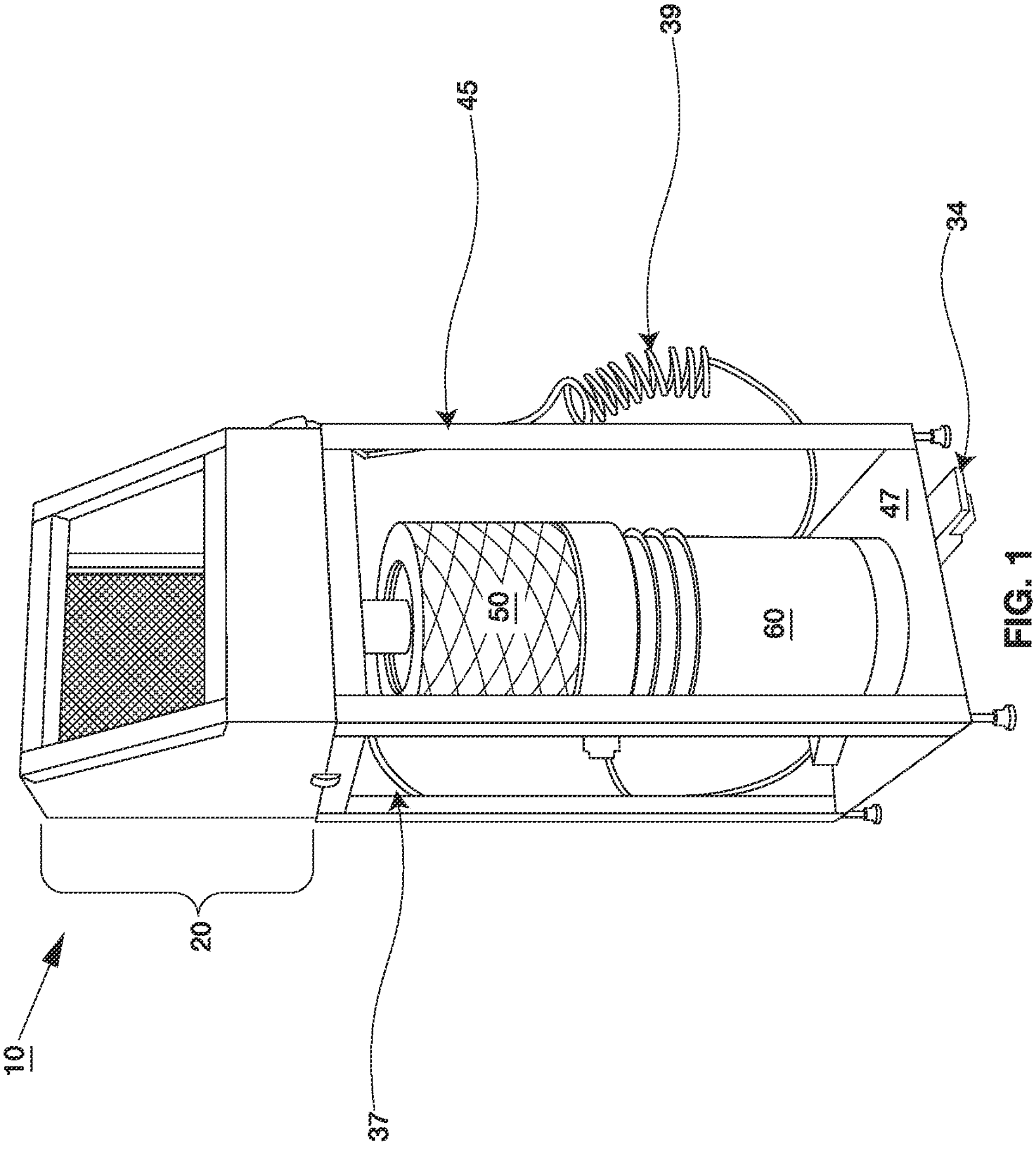
FIG. 1 depicts a side perspective view of a debris removal system.

Referring to FIG. 1, debris removal system 10 generally includes enclosure assembly 20 positioned above and releasably engaged with assembly stand 45. Filter assembly 50 and waste vessel 60 are positioned atop platform 47 within assembly stand 45. Foot pedal 34 is connected to the lower portion of assembly stand 45.

Figure 2:
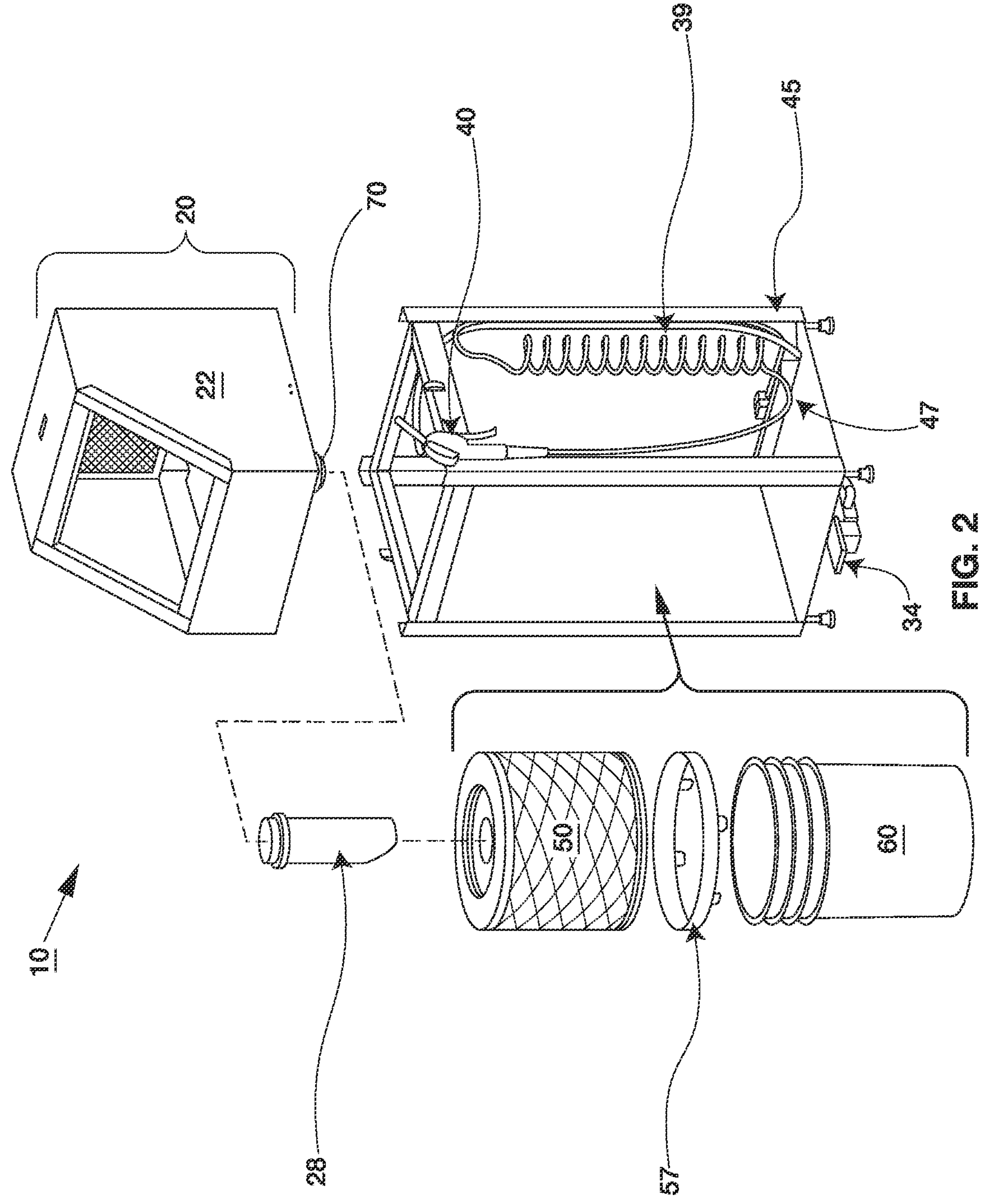
FIG. 2 depicts a side perspective view of a debris removal system with some parts in exploded view.

Referring to FIG. 2, Venturi vent 70 is engaged with and protrudes from underside of enclosure body 22, with exhaust tube 28 engaged with Venturi vent 70 when assembled for use. Exhaust tube 28 is positioned mostly within cavity of filter assembly 50 (shown best in FIG. 8), with filter assembly 50 releasably engaged with air filter lid 57, which is releasably engaged with waste vessel 60. Assembly stand 45 supports enclosure assembly 20, and is preferably constructed of 12 gauge cold rolled steel. In a preferred embodiment, a foam strip (not shown) acts as a slight buffer between the enclosure body 22 and assembly stand 45. In ordinary use filter assembly 50 with exhaust tube 28, air filter lid 57, and waste vessel 60 are positioned on platform 47. Coil air line 39 terminates at its distal end with air gun 40. A suitable coil air line is a retracting coil air line with threaded fittings, ¼×¼ Brass NPT Male, ¼" ID, 5⁄16" OD, 5 feet Long, with the commercially available McMaster Carr product having Part #5245K35 being preferred. An example of a suitable commercially available air gun is the air gun with composite nozzle from Prevost of Greenville, South Carolina.

Figure 3:
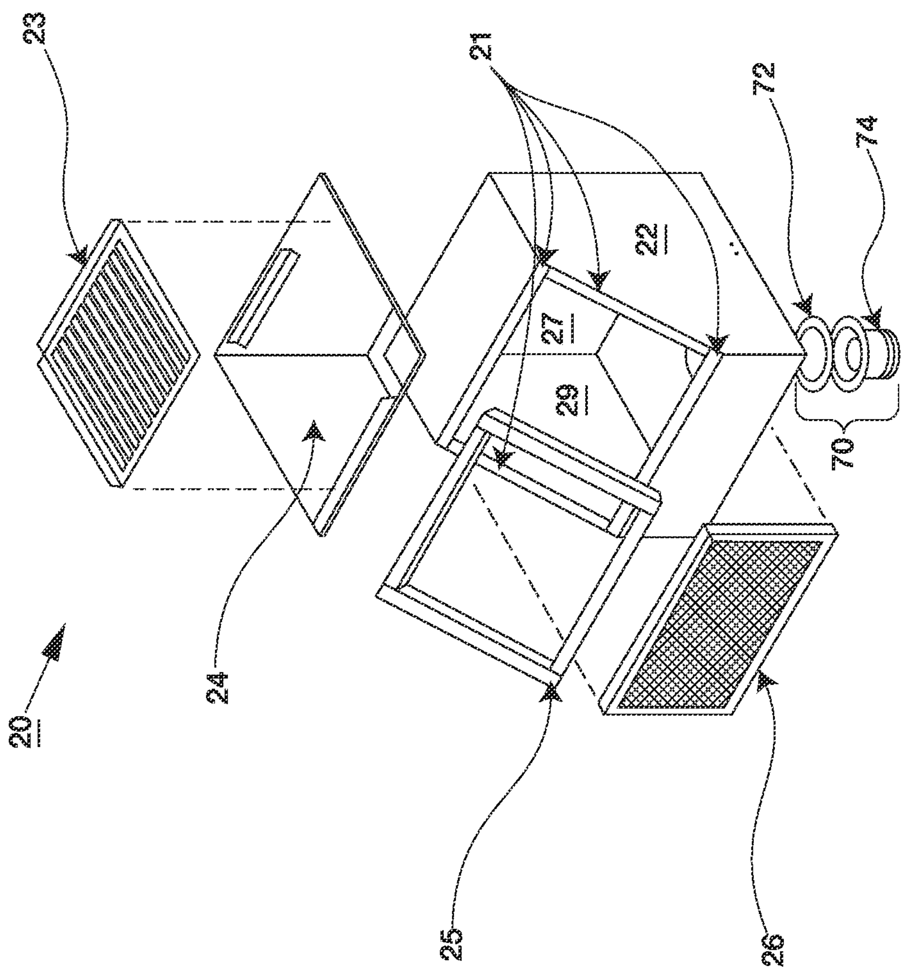
FIG. 3 depicts a top perspective view of an enclosure assembly with some parts in exploded view.

FIG. 3 depicts a more detailed view of enclosure assembly 20 including enclosure body 22 which is preferably constructed of 16 gauge cold rolled steel and includes a slanted enclosure opening 29 that is preferably approximately 10" tall by approximately 13.75" wide. Slanted opening 29 is preferably at an angle of approximately 30° to approximately 65° relative to the vertical, with an angle of approximately 55° being most preferred as this orientation optimally allows an operator who is spraying machined parts with compressed air within the enclosure assembly to grasp, manipulate and view the machined part for cleaning. Top, bottom and side flanges 21 along edges of slanted opening 29 prevent fluid coating, debris and other contaminants from escaping enclosure body 22 while in use. The bottom wall of enclosure body 22 defines an opening (unnumbered), preferably approximately 3.25" round, for receiving Venturi vent 70 and/or bolts associated there with.

Funnel 24 rests upon the bottom wall of enclosure body 22 and facilitates pulling ambient air down through Venturi vent 70 and into the system. Grate 23 sits atop funnel 24 and prevents machined parts from inadvertently dropping into enclosure body 22.

Enclosure filter 26 absorbs spray deflection during system use and is preferably positioned on back wall 27. In a preferred embodiment enclosure filter 26 is a mesh filter approximately 15.5" by approximately 9.5" by approximately 0.75" and is held in place by enclosure filter frame 25.

Figure 4:
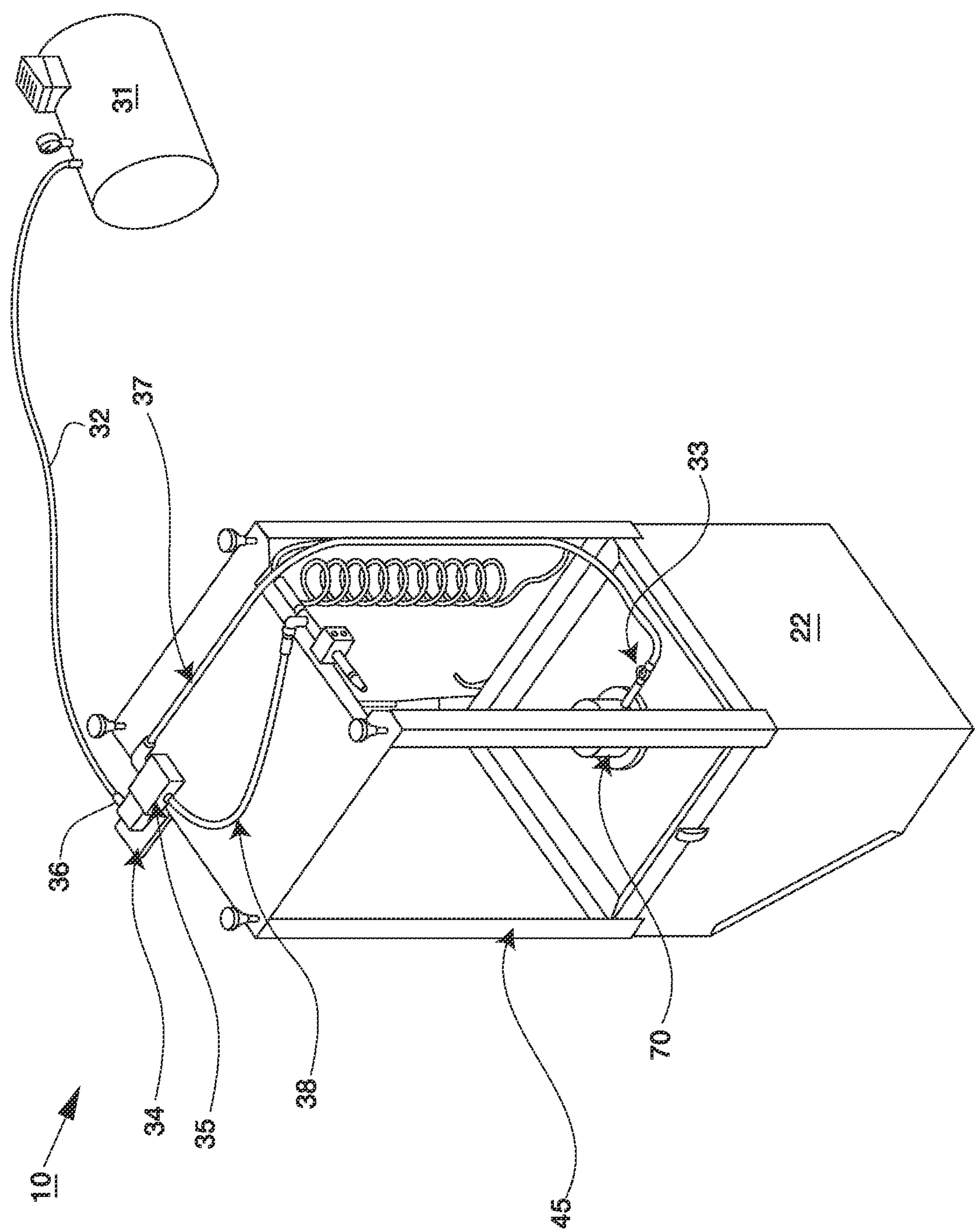
FIG. 4 depicts a bottom perspective view of a debris removal system without certain components within the assembly stand.

FIG. 4 depicts debris removal system 10, minus some components, from a bottom perspective view. Air supply 31 supplies the system with pressurized air, preferably at between approximately 70 PSI and 90 PSI with approximately 80 PSI being most preferred. A shop line is the preferred air supply but any source including a compressed air tank (shown) is also within the scope of the invention. Pneumatic foot pedal 34 is mounted to the bottom of assembly stand 45 and includes foot pedal inlet port 36 for receiving pressurized air via compressed air line 32, plus two outlet ports (not numbered) which feed air to Venturi vent air line 37 and to air gun air line 38. Depressing foot pedal 36 actuates foot pedal valve 35, which directs pressurized air via Venturi vent air line 37. It is noted that this configuration allows air gun 40 to function independently of Venturi vent 70 activation. Venturi vent ball valve 33 controls flow of air into Venturi vent 70.

Figure 5:
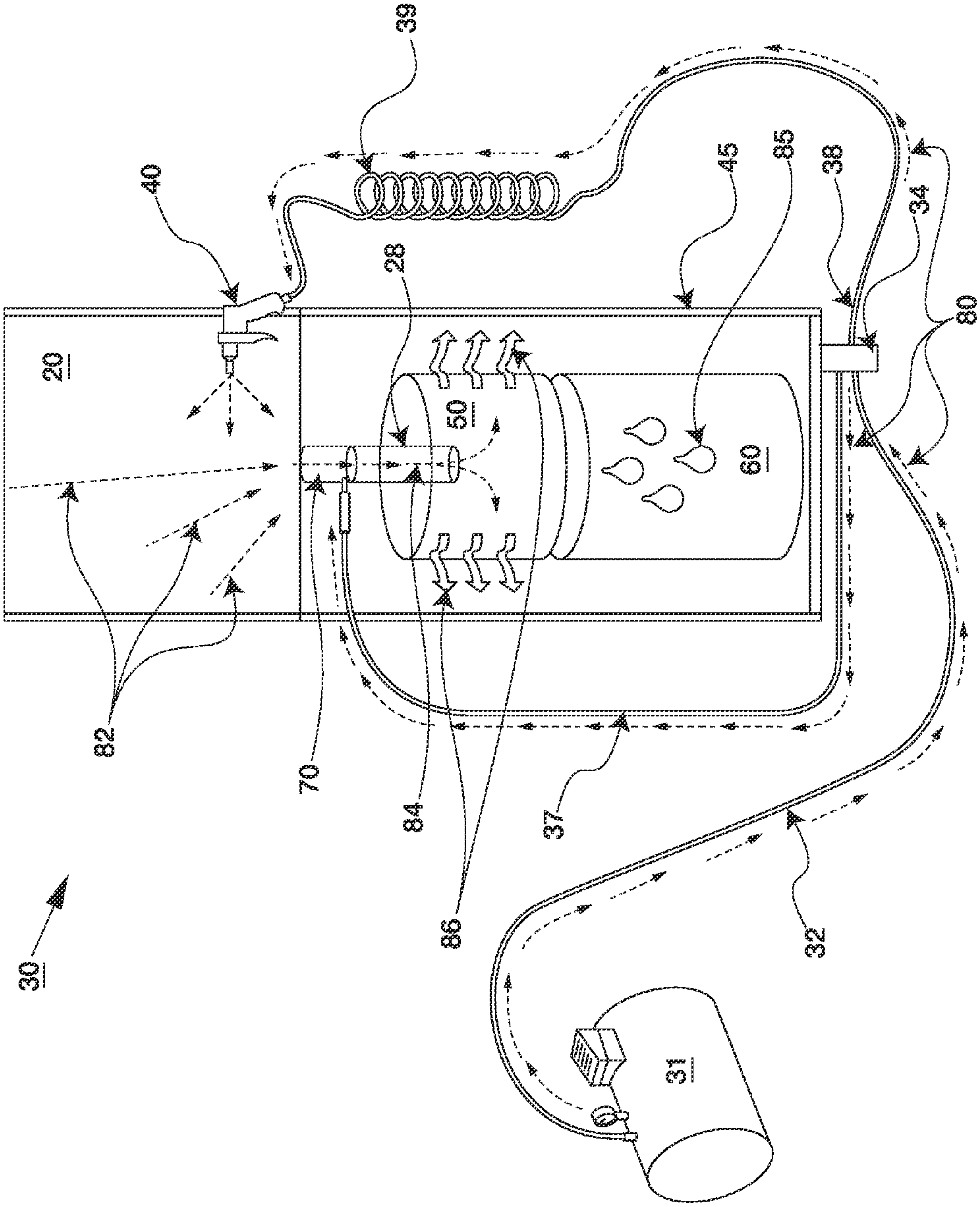
FIG. 5 schematically depicts the air system.
Figure 7:
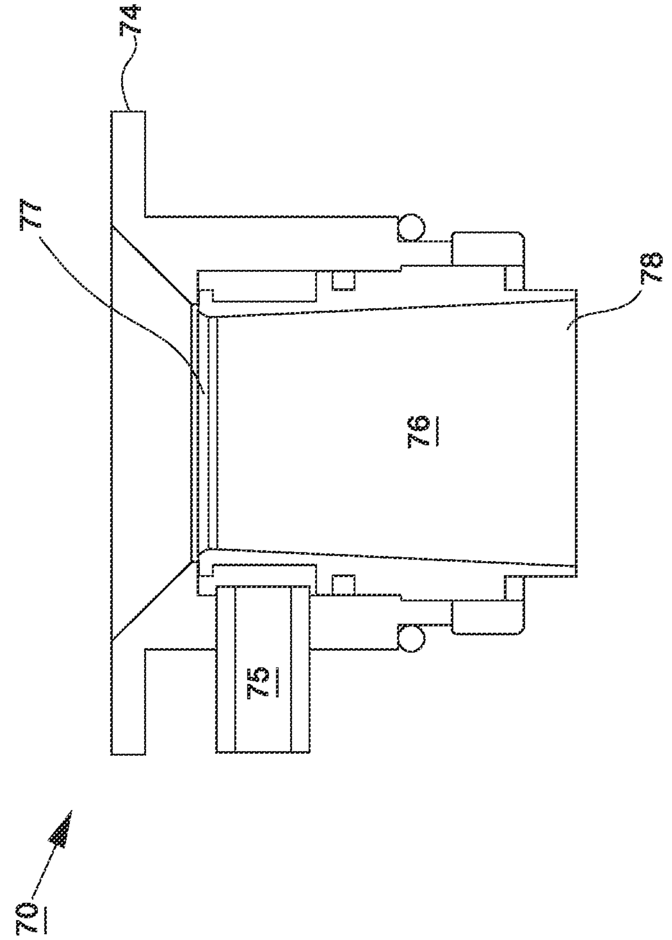
FIG. 7 depicts a cross sectional view of the Venturi vent of FIG. 5, as viewed from the perspective of the arrows in FIG. 6.

FIG. 5 schematically depicts air system 30. Compressed air flow 80 and ambient air flow 82 both enter Venturi vent 70, but via different routes. Compressed air flow 80 travels from air supply 31 to foot pedal valve 34, then either directly into Venturi vent 70 via Venturi vent air line 37, or via air gun air line 38 then drawn into Venturi vent 70 by negative pressure. Ambient air flow 82, however, is drawn directly into Venturi vent 70 by negative air pressure. Air entering Venturi vent 70, whether originally compressed or ambient, is collectively deemed contaminated air 84 and travels downwardly through exhaust tube 28 into filter assembly 50 which permits the outflux of decontaminated air 86 while retaining contaminants 85 within waste vessel 60. As used herein, "decontaminated air" and the like shall mean a 99% reduction in particles 0.6 microns and larger relative to air entering Venturi vent.

Figure 6:
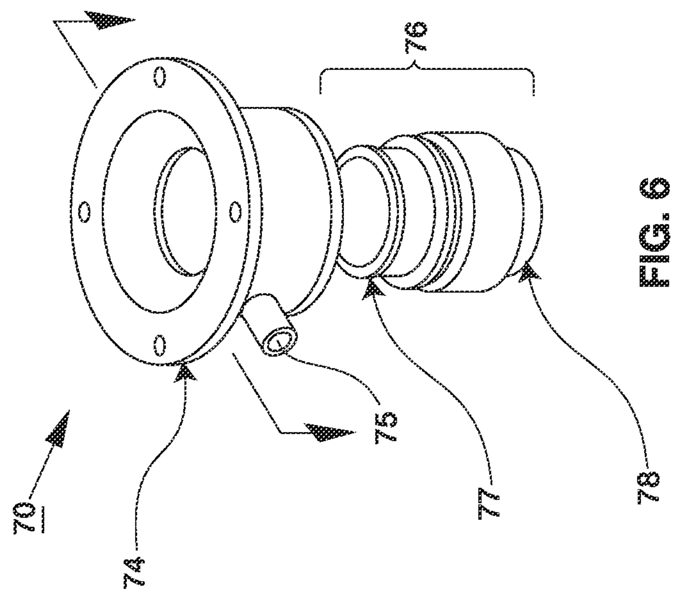
FIG. 6 depicts an exploded top perspective view of a Venturi vent.

The Venturi effect is the reduction in fluid pressure that results when a fluid flows through a constricted section of a pipe. In the present invention Venturi vent 70 facilitates the Venturi effect, thereby creating the negative pressure to draw air both expressed from air gun 40 and from ambient air flow 82, into the system. Referring to FIG. 6, Venturi vent 70 includes Venturi inlet 74 which is the aforementioned inlet for air drawn into the system via negative pressure. Downstream from Venturi inlet 74 is Venturi compressed air inlet port 75, through which Venturi vent air line 37 directs air directly into Venturi vent 70, thereby creating negative pressure or suction. Air, both that which is drawn through Venturi inlet 74, and that which enters through Venturi compressed air inlet port 75, travels down Venturi tube 76. It is noted that top opening 77 of Venturi tube 76 has a smaller diameter than bottom opening 78, thereby also creating negative pressure or suction which creates a downward air current that, when actuated, continuously evacuates air within enclosure body 22. In a preferred embodiment the Venturi flow is approximately 45 scfm at 80 psi, 28" w.c. vacuum.

Figure 8:
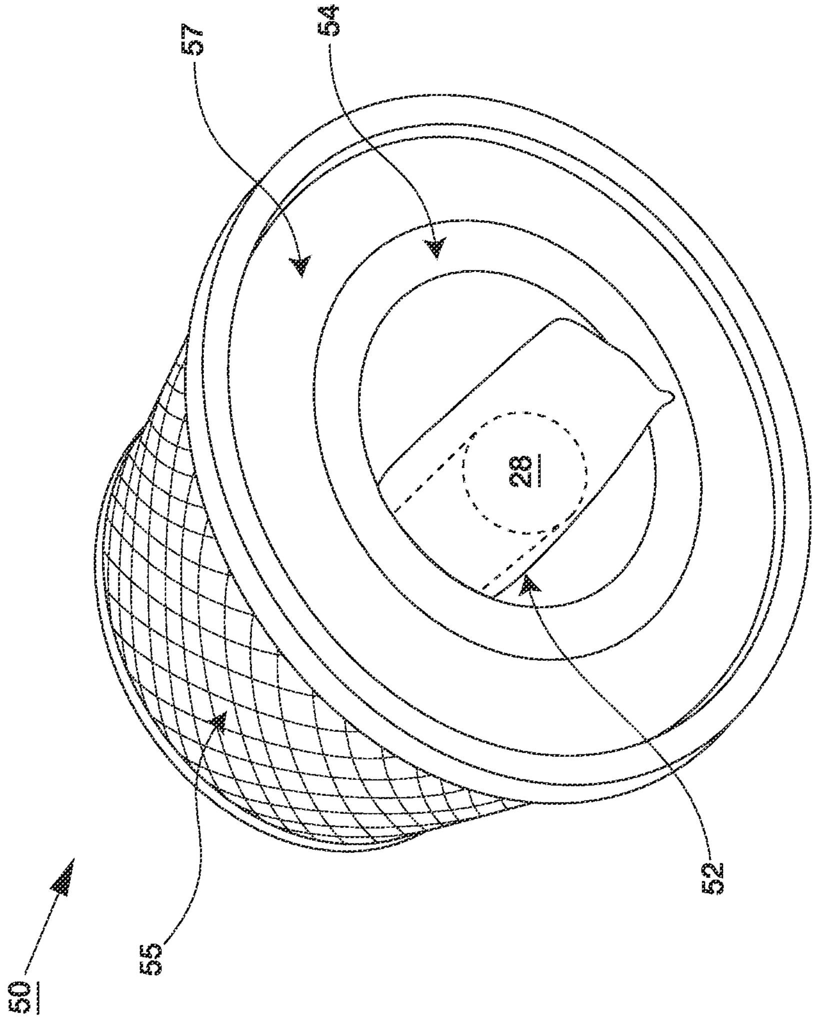
FIG. 8 depicts a bottom perspective view of a filter assembly.

Referring back to FIG. 2 for a moment, it is noted that exhaust tube 28 is the conduit through which air passing through Venturi tube 76 enters filter assembly 50. As shown in FIG. 8, air exiting exhaust tube 28 sequentially passes through three decontaminating stages.

Stage one is wet sock filter 52, which is preferably a felt filter bag of trade size 4, having dimensions of approximately 4" in diameter by approximately 14" long with a 50 micron rating. The bag filter is most preferably constructed of NOMEX plastic and felt for use with oils and hydrocarbon solvents, with a commercially available example being McMaster-Carr Part #51635k211.

Metal fragments and debris accumulate at the bottom of the wet sock filter 52, but smaller sized debris, oil and cleaning fluids pass through the wet sock filter and down into waste vessel 60. Notably, the large surface area of the wet sock filter, preferably approximately 4"×14", or 201 cubic inches, does not impede the flow of air as debris gets trapped inside.

Air passing through stage one builds up in waste vessel 60, thereby creating positive air pressure which causes post-stage one air to travel upwardly from waste vessel 60 and into stage two filtration, which is inner filter 54. Inner filter 54 is preferably a foam-based filter that removes thinner viscosity oils commonly cleaned off recently machined parts, as well as collects some smaller metal debris. In a preferred embodiment inner filter 54 is an open cell neoprene blue foam that is approximately ¼" thick, with a commercially available example being McMaster-Carr Part #8570K13.

Post-stage two air goes through outer filter 57, which is stage 3, before being released into the ambient factory air. Outer filter 57 is preferably a circular air filter with paper and fabric fins on the sides having a metal top with an approximately 3.03" round opening through which exhaust tube 28 is inserted, and having an outer diameter of approximately 12.11". It is further preferred that outer filter 57 is constructed of 80/20 cellulose/polyester and exhibits 99.9% efficacy at 0.6 microns. A suitable outer filter is commercially available from Damn Filters of Wichita, Kansas.

Referring back to FIG. 2, air filter lid 57 preferably releasably connects outer filter 57 to rim of waste vessel 60, thereby preventing pressurized air from escaping waste vessel 60 and bypassing stages two and three. In a preferred embodiment waste vessel 60 is a standard 5-gallon pail.

Figure 9:
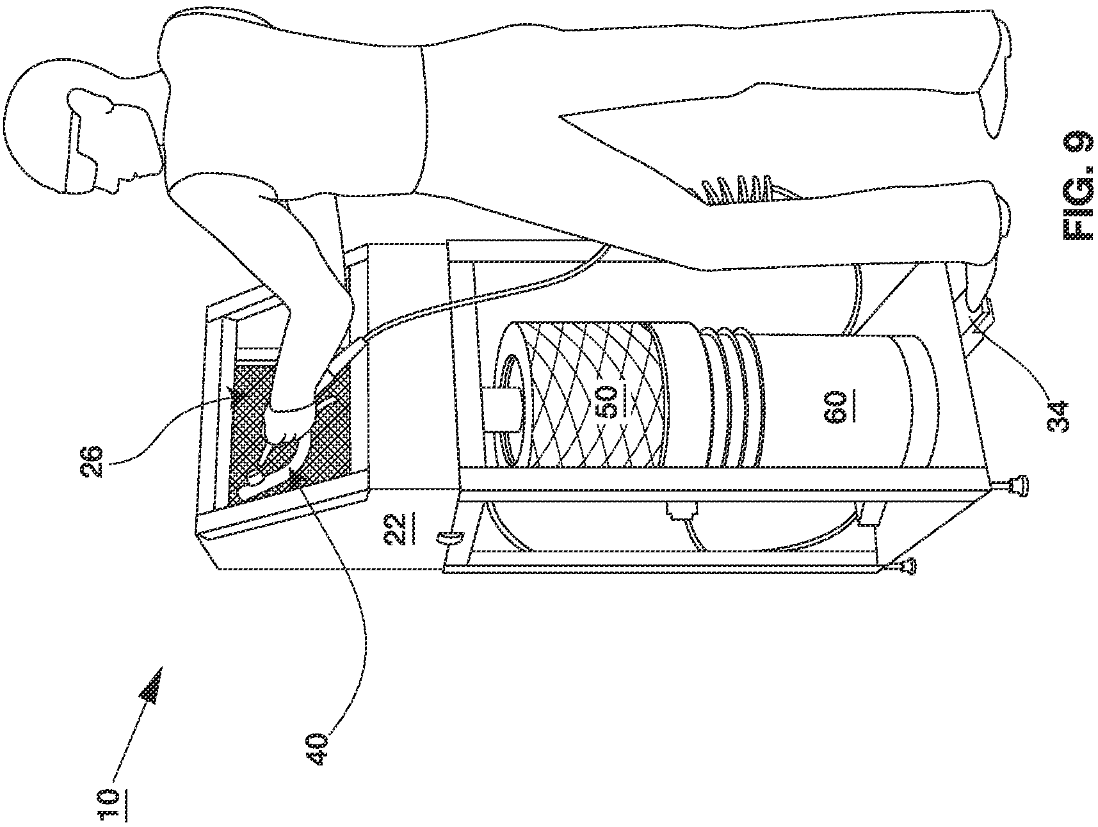
FIG. 9 depicts a debris removal system in use.

Referring to FIG. 9, in use an operator, which may be a robot, depresses foot pedal 34 to create negative downward pressure within enclosure body 22. While holding a machined part within enclosure body 22 the operator also intermittently directs a compressed air stream from air gun 40 towards machined part to blow off contaminants and residue. This compressed air is preferably between approximately 70 PSI and 90 PSI with approximately 80 PSI being most preferred. The contaminated air is drawn downwardly and filtered, with decontaminated air continuously being released into environment while liquid and particulate contamination is retained in filters and/or waste vessel 60. Routine maintenance of system includes emptying waste vessel 60, and cleaning or replacing wet sock filter 52, inner filter 54, and outer filter 55.

It should be understood that the foregoing relates to exemplary embodiments of the invention and that modifications may be made without departing from the spirit and scope of the invention as set forth in the following claims. Examples of modifications include using the system in semi-automated or fully automated manufacturing environments. Also, the air nozzle can be stationary and activated with the foot pedal, either with or without the air gun. Also, the operator/robotic arm can hold the part under the fixed air nozzle to clean off the part.

Terms such as "substantially" and the like shall mean within reasonable bounds when considering limitations such as machines, materials, manufacturing methods, and people. By way of example, a "substantially smooth" surface means there are no intentional bumps or irregularities. All ranges set forth herein include the endpoints as well as all increments there between, even if not specifically stated. By way of example 1 to 2 inches includes 1 inch, 1.000001 inches and so forth. Finally, unless otherwise stated or contrary to common sense, "approximate" and the like shall mean+/−10%.

What is claimed is:

1. A debris removal system including:

A. An enclosure body having an underside defining an aperture, and a back wall including an enclosure filter;

B. A Venturi vent engaged with and protruding from said enclosure body underside, said Venturi vent including a compressed air inlet port and a Venturi tube defining a top opening and a bottom opening, the bottom opening located below said enclosure body, an exhaust tube coupled to said bottom opening, wherein contaminated air within said enclosure body is drawn through said aperture into said Venturi tube via said top opening, discharged through said bottom opening into said exhaust tube, and passes through a wet sock filter configured to retain debris above a predetermined size at the bottom of said wet sock filter;

C. A cylindrical filter assembly in fluid communication with said exhaust tube and positioned downstream of said exhaust tube to receive said contaminated air discharged from said bottom opening and configured to separate at least some debris smaller than the predetermined size from air flowing through the cylindrical filter; and D. A waste vessel physically distinct from said filter assembly, releasably engaged with said filter assembly, positioned substantially beneath said filter assembly, and in fluid communication with said filter assembly.

2. The debris removal system of claim 1 wherein said enclosure body includes a slanted enclosure opening.

3. The debris removal system of claim 1 wherein said top opening has a smaller diameter than said bottom opening.

4. The debris removal system of claim 3 wherein said compressed air inlet port is positioned between said top opening and said bottom opening.

5. The debris removal system of claim 1 further comprising an assembly stand, said assembly stand housing said filter assembly and said waste vessel.

6. The debris removal system of claim 5 further comprising a foot petal engaged with said assembly stand.

7. The debris removal system of claim 6 wherein said foot petal actuates a flow of compressed air through said compressed air inlet port.

* * * * *